United States Patent
DiGiovanni et al.

(10) Patent No.: US 6,397,636 B1
(45) Date of Patent: Jun. 4, 2002

(54) METHOD OF APPLYING A PRECURSOR TO AN ASSEMBLED FIBER BUNDLE AND FUSING THE BUNDLE TOGETHER

(75) Inventors: David John DiGiovanni, Montclair; Mikhail Fishteyn, Bridgewater, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/315,631

(22) Filed: May 20, 1999

(51) Int. Cl.[7] .............................................. C03B 37/028
(52) U.S. Cl. ............................. 65/395; 65/408; 65/410; 65/411; 65/43
(58) Field of Search .......................... 65/395, 408, 409, 65/43, 410, 1, 411

(56) References Cited

U.S. PATENT DOCUMENTS

| | | | | |
|---|---|---|---|---|
| 2,992,956 A | * | 7/1961 | Bajinet | 65/410 |
| 3,004,368 A | * | 10/1961 | Hicks | |
| 3,033,731 A | * | 5/1962 | Cole | 65/410 |
| 3,190,738 A | * | 6/1965 | Upton | 65/43 |
| 3,222,152 A | * | 12/1965 | Upton | 65/43 |
| 3,253,896 A | * | 5/1966 | Woodcock | 65/43 |
| 3,622,297 A | * | 11/1971 | Johnson | 65/43 |
| 3,805,735 A | * | 4/1974 | Reuschel | 65/409 |
| 3,880,632 A | * | 4/1975 | Podvigalkina | 65/43 |
| 4,175,940 A | * | 11/1979 | Siegmund | 65/408 |
| 4,439,221 A | | 3/1984 | Smith et al. | 65/4.21 |
| 4,589,725 A | * | 5/1986 | Dyott | 65/410 |
| 4,799,949 A | * | 1/1989 | Keck | |
| 4,805,981 A | | 2/1989 | Gould | |
| 4,932,740 A | * | 6/1990 | Berkey | 65/409 |
| 5,408,554 A | | 4/1995 | Cryan et al. | |
| 5,472,471 A | * | 12/1995 | Baba | 65/409 |
| 5,500,917 A | | 3/1996 | Daniel et al. | 385/99 |
| 5,510,301 A | * | 4/1996 | Fink | |
| 5,682,453 A | | 10/1997 | Daniel et al. | 385/99 |
| 5,683,480 A | * | 11/1997 | Taniguchi | 65/43 |

FOREIGN PATENT DOCUMENTS

| | | | | |
|---|---|---|---|---|
| EP | 0893862 | | 1/1999 | H01S/3/06 |
| FR | 208343 | * | 1/1987 | 65/395 |
| GB | 2160676 | | 12/1985 | H01B/11/22 |
| JP | 5727207 | * | 2/1982 | 65/408 |
| JP | 09211257 | | 12/1997 | G02B/6/28 |
| WO | 8200898 | * | 3/1982 | 65/395 |

OTHER PUBLICATIONS

U.S. application No. 08/897,195 filed Jul. 21, 1997, by D.J. DiGiovanni, "Taped Fiber Bundles for Coupling Light Into and Out of Cladding–Pumped Fiber Devices".

U.S. application No. 08/999,429 filed Dec. 29, 1997 by D.J. GiGiovanni, "Method and Apparatus for Producing Fused Fiber Bundles".

* cited by examiner

*Primary Examiner*—John Hoffmann
(74) *Attorney, Agent, or Firm*—Lowenstein Sandler, PC

(57) ABSTRACT

Optical fiber bundles having high optical throughput can be produced with relatively high yield if gaps between fibers are eliminated by application of a particle-containing glass precursor material, exemplarily fumed silica in an aqueous medium. Manufacture of optical fiber bundles that comprise two or more fibers that each comprise a substantially planar surface (with the planar surfaces facing each other) is improved by application of a particle-free glass precursor material, e.g., partially hydrolysed tetramethyl orthosilicate, to the fiber bundle. After drying of the applied glass precursor material the fiber bundle is heated to fuse the fibers together.

8 Claims, 3 Drawing Sheets

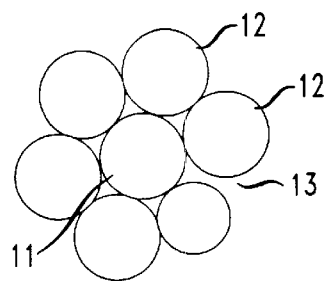
FIG. 1
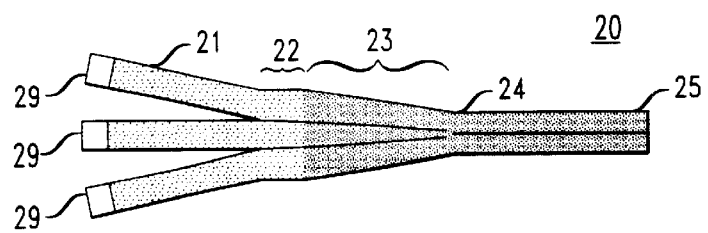
FIG. 2A
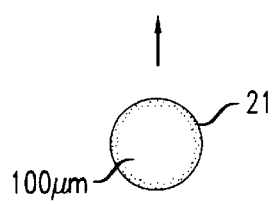 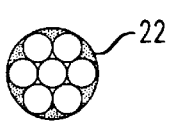 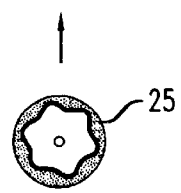
FIG. 2B   FIG. 2C   FIG. 2D
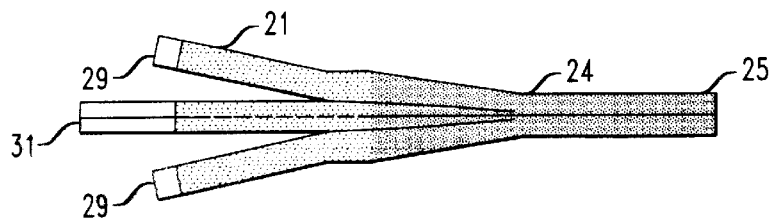
FIG. 3A
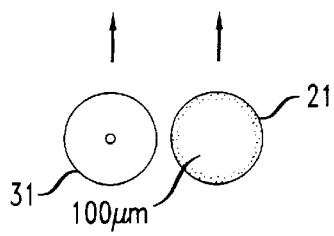 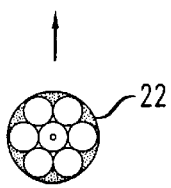 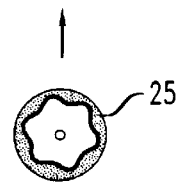
FIG. 3B  FIG. 3C   FIG. 3D   FIG. 3E

METHOD OF APPLYING A PRECURSOR TO AN ASSEMBLED FIBER BUNDLE AND FUSING THE BUNDLE TOGETHER

FIELD OF THE INVENTION

This application pertains to methods of making an optical fiber bundle, and to articles (e.g., an optical fiber amplifier or laser) that comprises such a bundle.

BACKGROUND OF THE INVENTION

Fiber bundles are used in a wide variety of optical applications including optical fiber amplifiers, couplers, splitters and cladding-pumped fiber lasers. In an exemplary application, a fiber bundle is used to couple light from a multiplicity of diode light sources to the inner cladding of a double clad fiber device. The bundle is made by fusing together individual optical fibers, typically also tapering the bundle to provide increased light intensity.

It is relatively straightforward to simply fuse multiple fibers into a bundle. However, it is generally difficult to make with high yield fiber bundles having high optical throughput. Thus, it would be desirable to have available a method of manufacturing reliably articles that comprise a fused fiber bundle and have high optical throughput. This application discloses such a method, and articles made be the method.

The technology for fusing two fibers together is well known. See, for instance, U.S. Pat. No. 4,439,221. See also Patent Abstracts of Japan, Unexamined Applications, Vol. 97, No. 8; 96JP-0014873, which discloses a process of making a fiber coupler that comprises coating the two bare fibers with a sol obtained by hydrolysis of silica acid ester (frequently referred to as "TEOS"), followed by heating of the coated fibers to fuse the fibers.

In a conventional process, two fibers are twisted together to bring them into intimate contact, and they are heated while the ends are being pulled apart. To combine more than two fibers, the same technique is conventionally used. See, for instance, U.S. patent applications Ser. Nos. 08/897,195 and 08/999,429, respectively filed Jul. 21, 1997 and Dec. 29, 1997 by DiGiovanni et al. for "Tapered Fiber Bundles for Coupling Light Into and Out of Cladding-Pumped Fiber Devices", and "Method and Apparatus for Producing Fused Fiber Bundles", respectively. U.S. Pat. Nos. 5,500,917 and 5,682,453 disclose an optical assembly that comprises a glass-based bonding compound and a method of making the assembly, respectively.

All patents, patent applications and other references cited herein are incorporated herein by reference.

Glossary and Definitions

By a "glass precursor material" we mean herein a liquid or particle-containing liquid which, upon heating, leaves an inorganic residue that comprises glassy silica as a major component. Such a material may be a colloidal sol in which glassy particles are suspended in a carrier liquid, e.g., fumed silica in an aqueous medium, or may be a silicon-containing compound which can be converted to silica by heating. An example of such a compound is waterglass (sodium silicate), which condenses upon drying and an subsequently be vitrified thermally. An exemplary organic silicon-containing compound is tetramethyl ammonium silicate, which forms a hard residue upon evaporation of its aqueous solvent. This residue reacts upon heating, forming a glass film as the organics burn away.

A "particle-free" glass precursor material is a glass precursor material to which no colloidal particles are intentionally added, and a "particle-containing" glass precursor material is a glass precursor material to which colloidal particle are added, or which forms colloidal particles.

By a "substantially planar" surface of an optical fiber we mean herein a surface that is nominally planar except for (typically unavoidable) minor departure from planarity. Such departures are inherent in, for instance, fibers that have been drawn from a preform of quadratic, rectangular, hexagonal, etc. cross section.

SUMMARY OF THE INVENTION

The instant invention is embodied in a method of making an article (e.g., an optical fiber amplifier or laser) that comprises a fused bundle of optical fibers, the method comprising the steps of providing a bundle of optical fibers, and heating said bundle of optical fibers such that said fused bundle of optical fibers results. Significantly, the method also comprises the step of applying, prior to said heating step, a glass precursor material to said bundle of fibers.

In a first embodiment of the invention, the glass precursor material comprises a colloidal sol (i.e., comprises colloidal particles), and in a second embodiment at least two of the optical fibers comprise substantially planar surfaces facing each other, and with the glass precursor material being particle-free glass precursor material.

Exemplary of colloidal particles that can be used in the practice of the invention is fumed silicia, and exemplary of particle-free precursor material is TEOS (partially hydrolized tetraethyl orthosilicate).

The former precursor material typically is used with bundles of fiber that contain (or are likely to contain) undesirably "gaps", exemplarily bundles of fibers of nominally circular cross section, but not excluding bundles of fibers with substantially planar surfaces. A particle-free precursor material is typically used with substantially gapless bundles that comprise fibers having substantially planar surface regions (e.g., fibers with quadratic, rectangular or hexagonal cross section, or with "D" shaped cross section). The particle-free precursor material serves to maintain, prior to fusing them, the fibers in the bundle in place, resulting in improved fused bundles.

BRIEF DESCRIPTION OF THE DRAWINGS

FIG. 1 schematically shows a prior art fiber bundle with gap;

FIGS. 2A–2D schematically depicts a plurality of bundled and tapered fibers;

FIGS. 3A–3E illustrate an alternative embodiment wherein at least one of the tapered fibers is a single-mode fiber;

The figures are provided for illustrative purposes only, and are not necessarily to scale or in proportion. Like or analogous features in different figures are generally designated by like numerals.

DETAILED DESCRIPTION

Figure 4A:
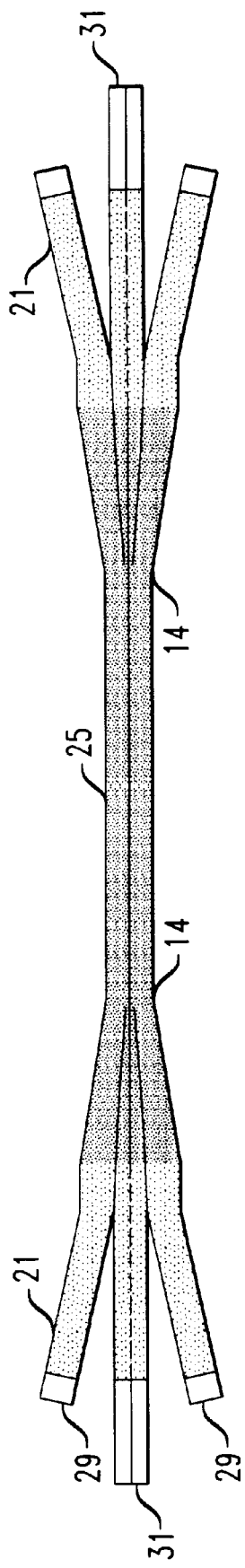
FIGS. 4A–4H show yet a further embodiment wherein bundles tapered fibers couple light into both ends of a cladding-pumped fiber.
Figures 4B, 4D, 4E, 4F, 4G:
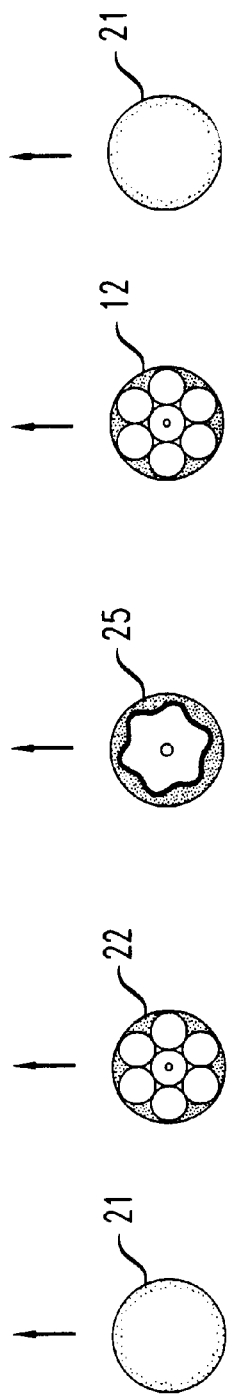
Figures 4C, 4H:

The discussion below will to a large extent be in terms of a particular embodiment namely, a method of making fused fiber bundles that comprise a multiplicity (e.g., six) of multimode fibers with circular cross section surrounding a single mode circular cross section fiber, which typically will be connected to another single mode fiber, exemplarily an Er—Yb-doped single mode fiber. This is done for the sake of concreteness only, and does not indicate that the invention is thus limited.

In our research, we have found that, for high transmission of multimode light through a fiber bundle, it is necessary that fiber deformation during heating of the fibers be minimal. On the other hand, in order to obtain high strength, the fibers typically should melt together, which inherently leads to some deformation. These observations indicate the need for deformation that is symmetrical and well controlled. This is especially true if a single mode fiber is present in the bundle, since single mode transmission is extremely sensitive to perturbations in the core of the single mode fiber. Consequently, it is generally desirable that the fiber bundle is securely arranged symmetrically (e.g., close packed around the single mode fiber) prior to heating, and that the temperature distribution is symmetrical about the longitudinal axis of the fiber bundle.

We have also found that there frequently are gaps in bundles of fiber. These are, exemplarily, due to a mismatch of fiber size and/or due to contamination with particulate debris, and can result in asymmetric bundles.

This is schematically shown in FIG. 1, with regard to a bundle of fibers with circular cross section, wherein numerals 11, 12 and 13, refer, respectively, to a single mode fiber, six multimode fibers, and a gap between two multimode fibers. We have observed that, if circular fibers do not have diameters within about 1 $\mu$m of each other, a gap will typically be formed. Those skilled in the art will recognize that it is a difficult task to maintain the fiber diameters within 1 $\mu$m, especially in a manufacturing environment. In bundles of fibers with substantially planar surfaces gaps can be due to, for instance, the presence of particulate debris between surfaces and/or variations in fiber dimensions.

U.S. Pat. No. 5,408,554 discloses a technique of making fiber bundles that avoids performance-decreasing gap formation by deliberate undersizing some of the fibers. This, of course, does not eliminate the need for high dimensional accuracy of the fiber diameter.

We have discovered that the above-described shortcoming can be overcome by use of a method that comprises application to the fiber bundle, prior to heating of the bundle, of glass precursor material that comprises a colloidal sol.

Indeed, the method according to the invention generally results in fused fiber bundles in which any gaps in the arrangement of fibers are filled. This insures intimate contact between fibers and allows the fibers to flow together symmetrically during heating, resulting in fused fiber bundles having high (e.g., $\geq$90%) optical through-put.

After application of the particle-containing glass precursor material to the (unfused) bundle of fibers and drying of the applied material, the residue is fused by appropriate heating. Temperature and duration of the heating step typically depend on the composition and particle size of the residue, but a minor amount of conventional experimentation will typically suffice to establish acceptable heat treatment conditions. For instance, the temperature will generally be significantly lower for P- or B-doped $SiO_2$ particles than it is for undoped fumed silica, the particle size being equal. Heating of the fibers above the softening temperature is generally required.

Doping of the colloidal sol with P or B is easily achieved by dipping of the fiber bundle with the dried residue thereon in phosphoric or boric acid, or in any other appropriate phosphorus- or boron-containing compound. Adding of dopant to the sol is also contemplated. Doping with other dopants is not precluded.

Use of the exemplary method according to the invention typically results in self-alignment of circular cross section fibers in close-packed structure, and results in fixation of that structure such that twisting of the fibers in general is not required. These advantages are attained without a need for accurate sizing of the fibers, and without a need for very high purity of the solutions for stripping and cleaning the fibers, and of the precursor material. The method according to the invention thus overcomes the above discussed problem.

As disclosed above, use of particle-containing glass precursor material is not limited to bundles of circular cross section fibers. The material advantageously is used whenever there are gaps in a fiber bundle, or whenever there is a likelihood of such gaps. The likelihood exists not only in bundles of circular cross section fibers but also in bundles of square, rectangular, hexagonal and other fibers, and particle-containing glass precursor material is advantageously applied to all such bundles.

Figure 5:
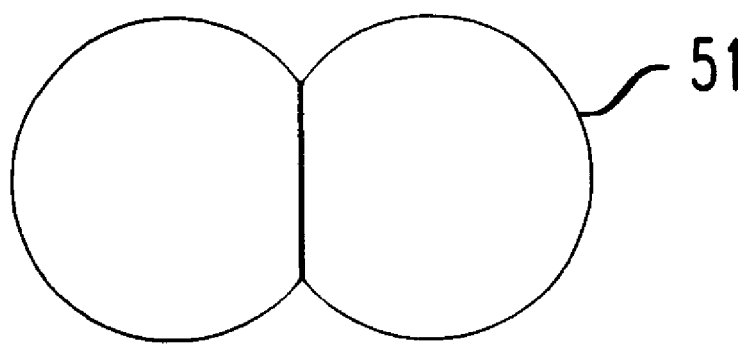
FIGS. 5 and 6 schematically show in cross section further bundles of optical fibers.
Figure 6:
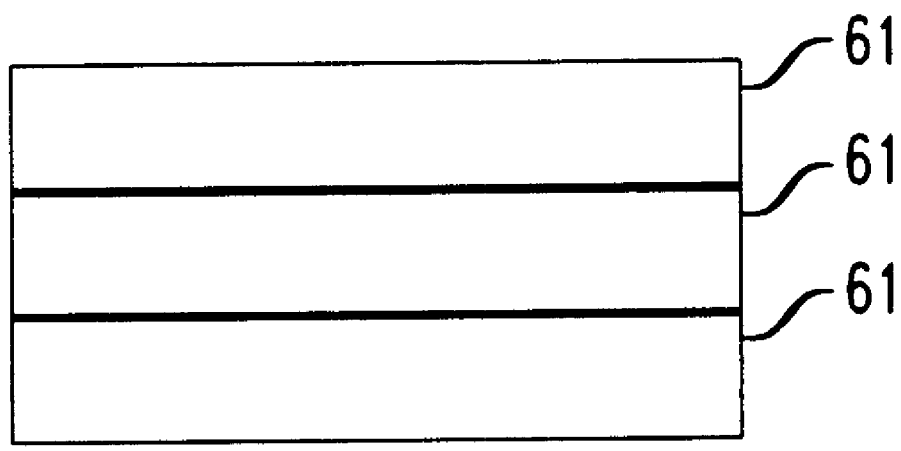

The invention is also embodied in a method of making an article that comprises a bundle of optical fibers, wherein at least two of the optical fibers comprise a planar surface, with the two planar surfaces facing each other. An exemplary such bundle (containing 2 D-shaped fibers 51) is depicted in cross section in FIG. 5, and FIG. 6 shows a further exemplary bundle containing three rectangular fibers. In both cases planar surfaces of adjacent fibers contact each other. To the preliminary assembled bundle is applied particle-free glass precursor material (exemplarily a dilute solution of hydrolyzed TEOS). The presence of precursor material between adjacent fibers causes the fibers to adhere together, and heating of the bundle fuses the fibers together substantially without gaps or other discontinuities.

"D"-shaped fibers as shown in FIG. 5 are known, as are rectangular (including square) cross section fibers. Rectangular cross section fibers are commercially available inter alia from Collimated Holes, Inc., Campbell, Calif.

The above discussion generally focuses on formation of a fused fiber bundle. However, in many embodiments of the invention the fused bundle is a tapered bundle. Tapering of the bundle can be achieved by a conventional method and will not be discussed in detail.

Referring to the drawings, FIGS. 2A–2D illustrate an arrangement 20 for pumping a cladding-pumped fiber comprising a plurality of individual multimode fibers 21 which converge to a bundle region 22 which extends to a tapered region 23 wherein the bundle tapers to a minimum diameter at 24 closely approximating the diameter of the cladding-pumped fiber 25. Preferably the fibers in the bundled region 22 are arranged in a close-packed formation wherein the interior fibers contact the maximum number of neighboring fibers (see FIG. 2C). Ideally the bundle tapers to a cross section approximating the inner cladding of the fibers 25. It is contemplated that each individual multimode fiber 21 (of which only three are shown in FIG. 2A) will couple light from an associated semiconductor emitter source 29 to the cladding-pumped fiber 25.

FIGS. 3A–3E illustrate an alternative embodiment of the invention wherein at least one of the bundled tapered fibers is a single-mode fiber 31.

In the discussion above, all of the bundled fibers are multimode fibers except for the central fiber 31 which has a single-mode core. The core of this central fiber can be used to efficiently couple light through the taper and into or out of the core of the cladding-pumped fiber while the multimode fibers 21 are used to couple light into the cladding of the cladding-pumped fiber.

FIGS. 4A–4H show yet a third embodiment of the invention wherein bundled tapered fibers couple light into both ends of a cladding-pumped fiber. In this instance the central fibers 31 are single mode, and the structure forms a cladding-pumped fiber amplifier.

EXAMPLE I

A seven-fiber bundle was fabricated to couple the outputs of six pump diodes into a fiber carrying single mode signal radiation. The six multimode fibers had a cladding diameter of 125 $\mu$m and a 105 $\mu$m core with 0.15 numerical aperture (NA). The single mode fiber was surrounded by the six multimode fibers. It had an outer diameter of 125 $\mu$m, and a 12 $\mu$m diameter Ge-doped core. All fibers had a 250 $\mu$m outside diameter polymer coating. The fiber bundle was inserted into a silica capillary tube (770 $\mu$m inside diameter) and the coatings were stripped by conventional means from 50 mm lengths of fibers that were protruding from the capillary. The bundle of stripped fibers was loosely held together, and a 40 mm length of the bundle was dipped into an aqueous sol that contained about 8–16 weight percent $SiO_2$ colloidal particles ("fumed silica") of average size 100 nm. After slow withdrawal of the bundle from the sol, the bundle was allowed to dry in air for about 10 minutes. This assembly was mounted in a chuck by gripping the capillary, then heated by means of a torch substantially as described in the above referenced '429 patent application. The gas flows were 200 sccm $H_2$ and 450 sccm $O_2$, and the torch was translated slowly down the assembly to heat the fibers to a temperature sufficient to melt the fibers together slightly, leaving interstitial gaps within the bundle. Upon completion of the pass, the protruding end of the at least partially fused bundle was inserted for a length of 3 mm into a silica capillary having 600 $\mu$m inside diameter. The torch was used to tack the bundle to the capillary, and the chucks that were holding the capillaries were moved apart while hearing to stretch the bundle so as to form a taper, with minimum diameter 125 $\mu$m. The thus produced tapered and fused bundle was free of gaps. Subsequently the bare fibers were polymer coated, and optical measurements were performed. The tapered bundle had a pump light throughput in the range 91–95% and a single mode throughput in the range 90–94%.

EXAMPLE II

A second tapered bundle was fabricated substantially as described in the preceding example, except that the aqueous sol further contained 1–5% by weight $HPO_3$. The tapered bundle had optical throughputs substantially as disclosed above.

EXAMPLE III

Three rectangular cross section fibers, having a 40×90 $\mu$m pure silica core surrounded by a 90×130 $\mu$m F-doped cladding, and coated with conventional optical fiber polymer coating were fed through a small silica capillary to hold the fibers together. The polymer was stripped from the ends that were protruding from the capillary using a conventional hot acid procedure. The resulting bare fiber ends were immersed in buffered oxide etchant (6:1) for 24 minutes to remove the F-doped glass cladding for a length of about 2 cm from the end. The fibers were then rinsed in methanol, followed by a rinse in deionized water. Subsequently the fibers were dipped in tetraethyl orthosilicate (TEOS) solution prepared by adding 0.03 ml of TEOS to 15 ml of water and 15 ml of ethanol, mixed ultrasonically to promote hydrolysis. After removal of the fibers from the solution the fibers were allowed to dry in air. The bundle was then heated, fused and tapered, substantially as described in Example I.

We claim:
1. Method of making an article comprising a fused bundle of optical fibers comprising the steps of
 a) providing a bundle of optical fibers; and
 b) heating said bundle of optical fibers such that said fused bundle of optical fibers results;
CHARACTERIZED IN THAT
 c) the method further comprises applying, prior to step b) a glass precursor material to said bundle of fibers; wherein
  i) the glass precursor material comprises colloidal particles; or
  ii) each of at least two of the optical fibers comprises a substantially planar surface, with said planar surfaces facing each other, and the glass precursor material is a particle-free glass precursor material.

2. Method according to claim 1, wherein the glass precursor material comprises colloidal particles.

3. Method according to claim 2, wherein the colloidal particles have a diameter in the range 1–10,000 nm.

4. Method according to claim 2, wherein the glass precursor material comprises silica-containing colloidal particles in an aqueous medium.

5. Method according to claim 1, wherein the bundle of optical fiber consists of optical fibers having essentially circular cross section, and the glass precursor material comprises colloidal particles.

6. Method according to claim 1, wherein the bundle of optical fibers comprises said at least two optical fibers that comprise a substantially planar surface, with said two planar surfaces facing each other, and wherein the glass precursor material comprises colloidal particles.

7. Method according to claim 1, wherein said heating step comprises tapering of the fused fiber bundle.

8. Method according to claim 1, comprising drying the glass precursor material applied to the fiber bundle.

* * * * *